(12) United States Patent
Manimaran et al.

(10) Patent No.: US 6,992,148 B2
(45) Date of Patent: Jan. 31, 2006

(54) RECOVERY OF ANTIMONY CATALYST RESIDUES FROM BROMINATION REACTION MIXTURES

(75) Inventors: Thanikavelu Manimaran, Baton Rouge, LA (US); Alvin E. Harkins, Jr., Baton Rouge, LA (US); Samuel H. Dubois, Grans (FR); Thomas J. Callender, Baton Rouge, LA (US)

(73) Assignee: Albemarle Corporation, Richmond, VA (US)

( * ) Notice: Subject to any disclaimer, the term of this patent is extended or adjusted under 35 U.S.C. 154(b) by 0 days.

(21) Appl. No.: 10/751,060

(22) Filed: Dec. 31, 2003

(65) Prior Publication Data

US 2005/0143528 A1    Jun. 30, 2005

(51) Int. Cl.
*C08C 19/12*    (2006.01)
*C08F 8/18*    (2006.01)

(52) U.S. Cl. ............... 525/355; 525/326.1; 525/326.4; 528/499; 528/502 R

(58) Field of Classification Search ............. 525/326.1, 525/326.4, 355; 528/499, 502 R
See application file for complete search history.

(56) References Cited

U.S. PATENT DOCUMENTS 4,352,909 A * 10/1982 Barda et al. ................ 525/157
5,723,549 A    3/1998 Dever et al.

FOREIGN PATENT DOCUMENTS

EP    0201411 A2    11/1986
GB    1 531 799    * 11/1978
WO    WO 96/31578    10/1996

* cited by examiner

*Primary Examiner*—Ling-Sui Choi
(74) *Attorney, Agent, or Firm*—Jeremy J. Kliebert

(57) ABSTRACT

A process for brominating a styrenic polymer in an organic solvent in the presence of an antimony trihalide catalyst such that a reaction mass containing brominated styrenic polymer in an organic phase is formed is improved by mixing hydrochloric acid or hydrobromic acid, or both, with said reaction mass at least once to extract antimony catalyst residues from said reaction mass as an acidic aqueous phase. Preferably, catalyst residues are recovered from the acidic aqueous phase and still more preferably, recovered antimony trihalide catalyst residues are recycled to constitute at least a portion of the antimony trihalide catalyst used in preparing the brominated styrenic polymer.

21 Claims, No Drawings

RECOVERY OF ANTIMONY CATALYST RESIDUES FROM BROMINATION REACTION MIXTURES

BACKGROUND

It is known to produce brominated styrenic polymers by brominating a styrenic polymer in a suitable solvent using bromine or bromine chloride and an antimony trihalide catalyst. See in this connection U.S. Pat. No. 4,352,909 to Barda et al., and U.S. Pat. No. 5,723,549 to Dever et al., the full disclosures of which are incorporated herein by reference. One of the products made in this way is a commercially available product available under the trademark Pyro-Chek 68PB flame retardant.

In order to minimize contamination of the brominated styrenic polymer product by excessive amounts of antimony catalyst residues, it has been the practice to subject the bromination reaction mass to an aqueous work up and to precipitate the antimony catalyst residues from the aqueous phase first as the oxychloride and then as the sulfide. In order to operate the process on a more efficient cost-effectiveness basis, it is desired to recover as much of the antimony catalyst residues as possible on an economical basis and if feasible, to recover the residues in a form that can be recycled for use as catalyst in the bromination step. It would be especially advantageous if the recovered product could be reused as catalyst in the process without adversely affecting either the bromination reaction or the properties of the brominated flame retardant product formed therewith.

This invention is deemed to achieve most, if not all, of these desired objectives.

SUMMARY OF THE INVENTION

In one of its embodiments this invention provides improvements in a process for brominating a styrenic polymer in an organic solvent in the presence of an antimony trihalide catalyst, wherein the reaction mass containing brominated styrenic polymer in an organic phase is treated with hydrochloric acid or hydrobromic acid, or both, at least once to extract antimony catalyst residues from the reaction mass as an acidic aqueous phase. This enables in further embodiments the facile recovery of antimony trihalide catalyst residues from the acidic aqueous phase, and in preferred embodiments the recycle of these catalyst residues as catalyst in the bromination reaction. In the process of brominating a styrenic polymer it is desirable to use an organic solvent that does not contribute to any significant polymer cross-linking.

Among the advantages made possible by the practice of this invention are:

a) the ease with which this invention can be implemented in actual practice;
b) avoidance of solids handling in the processing;
c) elimination of waste treatment/disposal;
d) elimination of sulfide treatment;
e) the ability to recycle both antimony halide catalyst residues and reaction solvent such as 1,2-dichloroethane; and
f) the ability to produce a brominated styrenic polymer flame retardant meeting, if not exceeding, prior product and performance specifications of Pyro-Chek 68PB flame retardant even when using the recycled antimony halide catalyst residues as catalyst in the bromination step.

In addition, the foregoing advantages can be achieved while at the same time significantly improving the economics of the overall process.

The above and other embodiments will be still further apparent from the ensuing description and appended claims.

FURTHER DETAILED DESCRIPTION OF THE INVENTION

This invention enables a more efficient and convenient way of removing, recovering, and recycling of antimony (III) catalyst as a mixture of bromide and chloride. Thus unless otherwise specified herein the term antimony trihalide as used herein refers to any one, or a mixture of two or more, of the following: $SbCl_3$, $SbBr_3$, $SbCl_2Br$, and $SbBr_2Cl$.

In broad perspective, the improved process can involve one or two workup operations, namely, (1) catalyst extraction and (2) catalyst recycle. The catalyst extraction involves recovering the antimony catalyst residues from the bromination reaction mass by extraction of the reaction mass with aqueous hydrochloric acid or aqueous hydrobromic acid (or both). If both aqueous hydrochloric acid and aqueous hydrobromic acid are used, they can be used as a mixture of both of them or they can be used in sequential extractions. Use of dilute aqueous HCl, preferably in the range of about 10% to about 20% aqueous HCl, enables complete or substantially complete extraction and recovery of the antimony catalyst residues from the reaction mass. However, more dilute or more concentrated aqueous HCl and/or HBr may be used. For example, use may be made of aqueous HCl of a concentration in the range of about 5 to about 38% and/or aqueous HBr of a concentration in the range of about 5 to about 48%.

The foregoing catalyst extraction procedure can be carried out in various ways using different types of equipment. The extraction can be conducted as a single extraction operation or two or more sequential extractions may be conducted, if desired. The ratio of volume of the aqueous acid to the organic reaction mixture is typically equal to or greater than about 2:1. To achieve intimate mixing of the two phases in an industrially-sized facility, a jet mixer or a liquid-liquid centrifuge, such as Robatel centrifuge, can be used to separate the phases.

The catalyst recycle to the bromination involves getting the antimony trihalide from the aqueous acidic extract into any suitable organic solvent, preferably 1,2-dichloroethane (EDC), with the antimony trihalide being in anhydrous form therein. This can be accomplished in different ways. Thus in one procedure a solvent exchange operation (commonly referred to as a "solvent swap") is conducted with an appropriate organic solvent, preferably EDC. This procedure can be accomplished with or without prior concentration of the acidic aqueous solution. A different procedure that can be used involves concentrating the acidic aqueous solution so that it reaches a concentration of at least about 65 wt % of antimony trihalide (calculated as $SbCl_3$). The resultant concentrated aqueous acidic solution is then partially extracted with organic solvent, preferably ethylene dichloride. The resultant solution in the organic solvent is then dried, if necessary, by stripping off some of the organic solvent that takes away with it, residual amounts of water that may be present.

When using the solvent swap procedure various organic solvents can be used. Preferred types of solvents are halogenated hydrocarbon solvents especially chlorohydrocarbon solvents such as carbon tetrachloride, chloroform, methylene chloride, 1,2-dichloroethane, 1,2-dibromoethane, 1,1,2-trichloroethane, 1,1,2,2-tetrachloroethane, bromochloromethane, and the like. Mixtures of two or more such solvents can be used. Of these solvents, 1,2-dichloroethane is especially preferred. While unsaturated aliphatic solvents can be used to form bromohydrocarbon solvents in situ, their use is not preferred as they would consume some of the bromine source in connection with addition to the unsaturation in such a solvent. It will be noted that the organic solvent used is preferably one that is suitable as a solvent medium for the bromination reaction. Preferred for use as a solvent is an organic solvent or a mixture of organic solvents that does not contribute to any significant polymer cross-linking during the bromination reaction.

Solvent swap is typically carried out by feeding the aqueous solution to a refluxing organic solvent. Water is removed as an azeotrope with the organic solvent. If it is desired to reduce the volume of the aqueous acidic solution before conducting the solvent swap, this can be accomplished by distilling off water until the desired concentration is achieved.

The result of the solvent swap is the formation of a solution of recyclable antimony trihalide catalyst in a suitable organic solvent such as EDC. This solution can be charged into the bromination reactor or bromination reaction zone in the appropriate catalytic quantity, which typically is in the range of about 2 to about 10 percent by weight based on the weight of the styrenic polymer to be brominated.

If the procedure used involves concentrating the acidic aqueous solution so that it reaches a concentration of at least about 65 wt % antimony trihalide, and then extracting the concentrated solution with organic solvent such as EDC, the concentration step can be carried out as described above except that the operation is conducted long enough for the concentration to reach a specified level in the vicinity of about 65 wt %. If the solution contains materially less than about 65 wt %, the extraction with EDC or one or more other chlorohydrocarbons, and/or with one or more bromohydrocarbon solvents and/or with one or more bromochlorohydrocarbon solvents may not extract a substantial amount of the antimony trihalide catalyst residues. Thus in any case where an organic solvent other than EDC is used, a few pilot experiments should be carried out to determine the partition coefficients as between the organic solvent and various concentrations of the catalyst residue in the aqueous acidic solutions of various concentrations. In this way, the minimum and optimum concentration of catalyst residue in the acidic aqueous solution for the given organic extracting solvent can be ascertained.

The ensuing extraction step with the selected organic solvent is then carried out. For this operation on an industrial scale, a jet mixer or a liquid-liquid centrifuge is typically employed. In operations conducted on a laboratory scale, a separatory funnel is typically used.

Here again, the result of use of the procedure involving concentrating the acidic aqueous solution to a suitable level, followed by extraction with organic solvent, preferably EDC, is the formation of a solution of recyclable antimony trihalide catalyst in a suitable organic solvent such as EDC. This solution can be charged into the bromination reactor or bromination reaction zone in the appropriate catalytic quantity, which typically is in the range of about 2 to about 10 percent by weight based on the weight of the styrenic polymer to be brominated. Preferred organic solvents for use as the extraction solvent is an organic solvent or a mixture of organic solvents that does not contribute to significant polymer cross-linking in an ensuing bromination reaction.

The quality of Pyro-Chek 68PB flame retardant made using recycled catalyst can meet or exceed that of the product made in operations in which fresh antimony catalyst is used. This is demonstrated by the data presented in Table 1 wherein "68PB" refers to Pyro-Chek 68PB brominated polystyrene flame retardant as commercially produced. Whereas BrPS refers to brominated polystyrene produced in the laboratory. The thermal stability data in Table 1 involved use of a test procedure generally as described in U.S. Pat. No. 5,637,650. In particular, each sample is run in duplicate. A 2.00±0.01 g sample is placed into a new clean 20×150 mm test tube. With a neoprene stopper and Viton® fluoroelastomer tubing, the test tube is connected to a nitrogen purge line with exit gas from the test tube being passed successively through subsurface gas dispersion frits in three 250-mL sidearm filter flasks each containing 200 mL of 0.1 N NaOH and 5 drops of phenolphthalein. With a constant nitrogen purge at 0.5 SCFH, the test tube is heated at 300° C. in a molten salt bath (51.3% $KNO_3$/48.7% $NaNO_3$) for 15 minutes followed by 5 minutes at ambient temperature. The test tube containing the sample is then replaced with a clean dry test tube, and the apparatus is purged with nitrogen for an additional 10 minutes with the empty test tube in the 300° C. salt bath. The test tube, tubing and gas dispersion tubes are all rinsed with deionized water, and the rinse is combined quantitatively with the solutions in the three collection flasks. The combined solution is acidified with 1:1 $HNO_3$ and titrated with 0.01 N $AgNO_3$ using an automatic potentiometric titrator (Metrohm 670, 716, 736, or equivalent). Results are calculated as ppm HBr, ppm HCl, and ppm HBr equivalents as follows:

ppm HBr=(EP1)(N)(80912)/(sample wt.)

ppm HCl=(EP2−EP1)(N)(36461)/(sample wt.)

ppm HBr equivalents=(EP2)(N)(80912)/(sample wt.)

where EP(x)=mL of $AgNO_3$ used to reach end point x; and N=normality of $AgNO_3$. The tubing is thoroughly dried with nitrogen before the next analysis. Each day before the first sample, three empty clean test tubes are run as blanks to assure there is no residual hydrogen halide in the system.

In Table 1 the samples of flame retardant tested were produced as follows:

BrPS made with fresh $SbBr_3$; Samples 1–3—These samples were obtained by brominating 20 g of polystyrene with BrCl in 1,2-dichloroethane solvent using 2.0 to 2.5 g of fresh $SbBr_3$ catalyst following a procedure similar to U.S. Pat. No. 5,726,252.

BrPS made with recovered $SbBr_3$ from 75% solution; Solutions 1–3—These samples which represent the practice of the present invention were formed by brominating 20 g of polystyrene with BrCl in 1,2-dichloroethane solvent using a catalyst solution containing 2.0 to 2.5 g of $SbBr_3$. The catalyst solution was obtained by extracting a 75 wt % aqueous solution of $SbBr_3$ with 1,2-dichloroethane. Solution 3 was prepared by stripping off 15 wt % 1,2-dichloroethane from the catalyst solution.

TABLE 1

| Flame Retardant tested | Wt % Br | Wt % Cl | Color (ΔE) | Thermal HBr (ppm) | Thermal HCl (ppm) |
|---|---|---|---|---|---|
| BrPS made with fresh SbBr₃; Sample 1 | 66.8 | 1.53 | 19.56 | 1251 | 722 |
| BrPS made with fresh SbBr₃; Sample 2 | 63.9 | 1.46 | 9.7 | 2250 | 1526 |
| BrPS made with fresh SbBr₃; Sample 3 | 66.2 | 1.68 | 10.51 | 2151 | 1380 |
| BrPS made with recovered SbBr₃ from 75% solution; Solution 1 | 67.3 | 1.4 | 13.71 | 1378 | 882 |
| BrPS made with recovered SbBr₃ from 75% solution; Solution 2 | 66.7 | 1.68 | 11.97 | 664 | 596 |
| BrPS made with "dry" recovered SbBr₃ from 75% solution; Solution 3 | 66.9 | 0.89 | 12.34 | 1633 | 749 |

The bromination can be conducted on a batch or continuous basis. When conducting a batch process the recycled catalyst is charged into the reactor with or without fresh antimony trihalide catalyst before or concurrently with introduction of the bromine source to the reaction mixture. When conducting the bromination on a continuous basis, the catalyst recovery and recycle can be performed in any manner that ensures that the requisite catalytic quantity of the recycled antimony trihalide catalyst with or without fresh antimony trihalide catalyst is present in the reaction mixture being continuously formed and reacted.

Preferred conditions for effecting the bromination are given in the two U.S. patents referred to at the outset.

The following Examples illustrate methods for the practice of this invention but are not intended to limit the scope of the invention to the procedures and conditions given therein.

Example 1 illustrates a catalyst extraction operation pursuant to this invention.

EXAMPLE 1

Polystyrene was brominated by treating a solution of 20 g of polystyrene in 380 g of ethylene dichloride (EDC) with 75 g of EDC in the presence of 1.5 g of antimony trichloride. A portion of the reaction mixture was stirred vigorously with 100 mL of 10% HCl for 15 minutes. The mixture was then allowed to stand for 15 minutes to enable the layers to separate from each other. The bottom organic phase was recovered and returned to the reactor. The top aqueous phase was recovered and collected in a bottle. This organic phase was again extracted with 75 mL of 10% HCl and the aqueous phase was collected in the bottle. The total combined aqueous phase weighed 190 g. This aqueous extract was found to contain 4300 ppm of antimony by ICP analysis, which accounted for all antimony introduced as antimony trichloride catalyst.

Example 2 illustrates catalyst recovery operations from an acidic aqueous solution pursuant to this invention. In Part A, a solvent swap operation with EDC was used. In Part B the catalyst recovery was effected by extraction of a concentrated acidic aqueous solution with EDC.

EXAMPLE 2

The aqueous solution of catalyst (mainly SbBr₃) from Example 1 is concentrated by distilling off water and HCl.

Part A:

A 250 mL 3-necked flask was fitted with a feed tube, a thermometer and a modified Dean-Stark trap to return heavier liquid to the flask. EDC (125 g) was taken in the flask and heated to reflux. An aqueous acidic solution containing about 5 wt % antimony tribromide was fed to the flask at a rate of 0.3 mL/min. Water from the feed was continuously removed as azeotrope with the refluxing EDC to the modified Dean-Stark trap. The bottom EDC phase in the trap was returned to the flask. The feeding of the aqueous solution took about 4.5 hours. After the addition, azeotropic distillation was continued for 1 hour. At the end, distillation was carried out without returning the distilled wet EDC back to the flask to dry the EDC solution. Heating was turned off and the EDC solution of antimony tribromide was stored for bromination. The weight of the aqueous phase in the overhead was 95.8 g. The weight of EDC in the overhead was 69.5 g. The weight of antimony tribromide solution in EDC in the flask was 57.5 g and thus the solution had a concentration of about 7.6 wt % of antimony tribromide.

Part B:

A concentrated aqueous acidic solution (40 g) containing 75 wt % of antimony tribromide was stirred vigorously with 10 g of EDC and then allowed to stand. After the allowing the phases to separate, the EDC phase was isolated. The aqueous was extracted two more times (2×10 g) with EDC and then mixed with other aqueous extracts of the catalyst for further concentration. The combined EDC phases were collected and found to contain about 15 wt % of antimony tribromide. An aliquot of this EDC solution was used as the catalyst solution for the bromination of polystyrene.

Even though the claims hereinafter may refer to substances, components and/or ingredients in the present tense ("comprises", "is", etc.), the reference is to the substance, component or ingredient as it existed at the time just before it was first contacted, blended or mixed with one or more other substances, components and/or ingredients, or if formed in solution, as it would exist if not formed in solution, all in accordance with the present disclosure. It matters not that a substance, component or ingredient may have lost its original identity through a chemical reaction or transformation during the course of such contacting, blending, mixing, or in situ formation, if conducted in accordance with this disclosure.

Each and every patent or publication referred to in any portion of this specification is incorporated in toto into this disclosure by reference, as if fully set forth herein.

This invention is susceptible to considerable variation in its practice. Therefore the foregoing description is not intended to limit, and should not be construed as limiting, the invention to the particular exemplifications presented hereinabove. Rather, what is intended to be covered is as set forth in the ensuing claims and the equivalents thereof permitted as a matter of law.

That which is claimed is:

1. In a process for brominating a styrenic polymer in an organic solvent in the presence of an antimony trihalide catalyst such that a reaction mass containing brominated styrenic polymer in an organic phase is formed, the improvement which comprises mixing hydrochloric acid or hydrobromic acid, or both, with said reaction mass at least once to extract antimony catalyst residues from said reaction mass as an acidic aqueous phase, and recovering antimony catalyst residues from at least a portion of the acidic aqueous phase by extracting antimony catalyst residues from at least a portion of the acidic aqueous phase into an organic solvent to thereby form a solution of antimony trihalide catalyst residues in the organic solvent.

2. The improvement as in claim 1 wherein the acid mixed with said reaction mass is hydrochloric acid.

3. The improvement as in claim 1 wherein the acid mixed with said reaction mass is in the range of about 10 to about 20% aqueous hydrochloric acid.

4. The improvement as in claim 1 further comprising making a separation between said aqueous phase and said organic phase.

5. The improvement as in claim 4 wherein the acid mixed with said reaction mass is in the range of about 10 to about 20% aqueous hydrochloric acid.

6. The improvement as in claim 1 wherein said organic solvent consists essentially of 1,2-dichloroethane.

7. The improvement as in claim 1 wherein said acidic aqueous phase is concentrated to reach a concentration of at least about 65 wt % of antimony trihalide, calculated as $SbCl_3$, prior to said extracting of said antimony catalyst residues from said acidic aqueous phase into an organic solvent.

8. In a process for brominating a styrenic polymer in an organic solvent in the presence of an antimony trihalide catalyst such that a reaction mass containing brominated styrenic polymer in an organic phase is formed, the improvement which comprises extracting at least a portion of said organic phase at least twice with dilute aqueous hydrochloric acid to form an acidic aqueous phase containing extracted antimony catalyst residues from said reaction mass, and recovering at least some catalyst residues from at least a portion of said acidic aqueous phase, and recovering at least a portion of antimony catalyst residues from at least a portion of the acidic aqueous phase by extracting antimony catalyst residues from at least a portion of the acidic aciueous phase into an ornanic solvent to thereby form a solution of antimony trihalide catalyst residues in the oraanic solvent.

9. The improvement as in claim 8 wherein antimony trihalide initially present in said solvent prior to initiation of the bromination is antimony trichioride.

10. The improvement as in claim 8 wherein the bromination is effected by charging elemental bromine or bromine chloride, or a mixture thereof into a mixture comprised of said organic solvent, styrenic polymer, and antimony trihalide catalyst.

11. The improvement as in claim 10 wherein prior to initiation of the bromination, the antimony trihalide initially present in said mixture is antimony trichloride.

12. The improvement as in any of claims 8–11 wherein said organic solvent consists essentially of 1,2-dichloroethane.

13. The improvement as in any of claims 8–11 further comprising recovering at least some brominated styrenic polymer from said organic phase, and water washing and drying at least some of the recovered brominated styrenic polymer.

14. The improvement as in claim 13 wherein said organic solvent consists essentially of 1,2-dichloroethane.

15. A process for preparing a brominated styrenic polymer, which process comprises:
   a) charging elemental bromine or bromine chloride, or a mixture thereof into a mixture comprised of at least one organic solvent, styrenic polymer, and antimony trihalide catalyst such that brominated styrenic polymer is formed and is present in the resultant reaction mass which is also comprised of organic solvent and antimony trihalide catalyst residues;
   b) mixing dilute aqueous hydrochloric acid or hydrobromic acid, or both, with said reaction mass at least once to extract antimony trihalide catalyst residues from said reaction mass as an acidic aqueous phase;
   c) recovering at least some antimony trihalide catalyst residues from at least a portion of the acidic aqueous phase; and
   d) recovering at least some brominated styrenic polymer from at least a portion of the organic phase.

16. A process as in claim 15 wherein said antimony trihalide catalyst residues are recovered from at least a portion of the acidic aqueous phase by replacing the acidic aqueous phase by substantially anhydrous organic solvent to thereby form a solution of antimony trihalide catalyst residues in said organic solvent.

17. A process as in claim 16 wherein said substantially anhydrous organic solvent is 1,2-dichloroethane.

18. A process as in claim 16 wherein said acidic aqueous phase is made more concentrated prior to replacing the acidic aqueous phase by the substantially anhydrous organic solvent.

19. A process as in claim 15 wherein said antimony trihalide catalyst residues are recovered from at least a portion of the acidic aqueous phase by concentrating said aqueous phase to an aqueous solution containing at least about 65 wt % of antimony trihalide and extracting said aqueous solution with substantially anhydrous organic solvent to form a solution of antimony trihalide in said organic solvent.

20. A process as in claim 19 wherein said substantially anhydrous organic solvent is 1,2-dichloroethane.

21. A process as in any of claims 16–20 further comprising recycling recovered antimony trihalide catalyst residues to the mixture in a) so that said recycled antimony trihalide catalyst residues constitute at least a portion of the antimony trihalide catalyst in said mixture in a).

\* \* \* \* \*